No. 689,928. Patented Dec. 31, 1901.
W. SPARROW & N. P. NELSON.
MACHINE FOR MAKING EXTENSION JOINTS FOR ROLLERS.
(Application filed Feb. 13, 1901.)
(No Model.) 2 Sheets—Sheet 1.
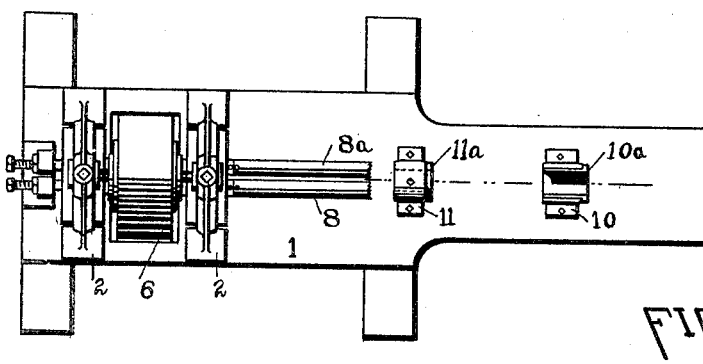
FIG. 1.
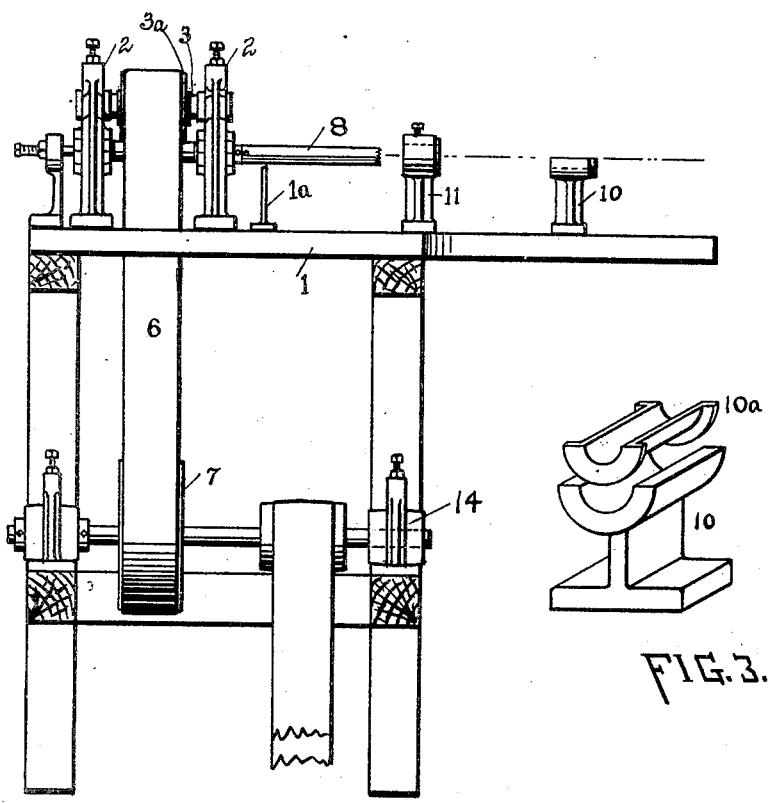
FIG. 2.
FIG. 3.
WITNESSES:
W. Stephens
J. Gould,
William Sparrow
Nels Peter Nelson
INVENTORS
BY
Geo. B. Willcox ATTORNEY.

No. 689,928. Patented Dec. 31, 1901.
W. SPARROW & N. P. NELSON.
MACHINE FOR MAKING EXTENSION JOINTS FOR ROLLERS.
(Application filed Feb. 13, 1901.)
(No Model.) 2 Sheets—Sheet 2.
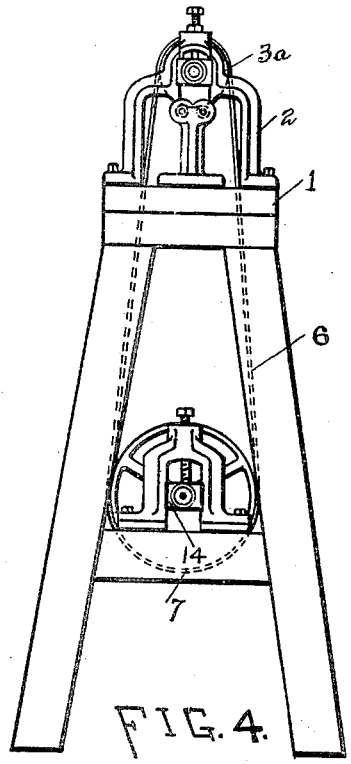
FIG. 4.
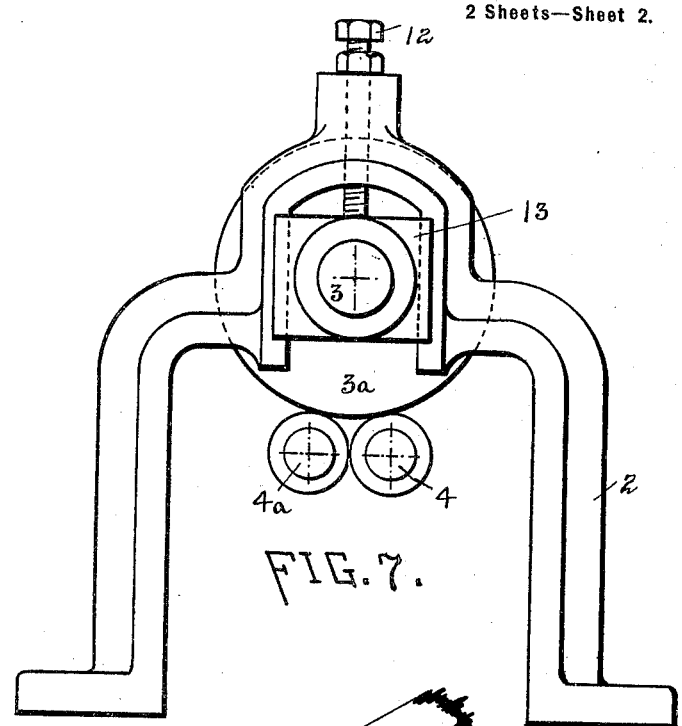
FIG. 7.
FIG. 6.
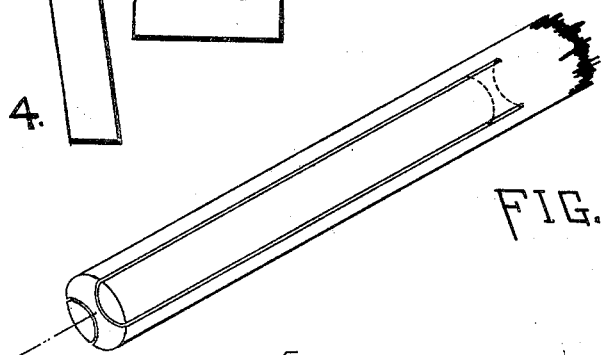
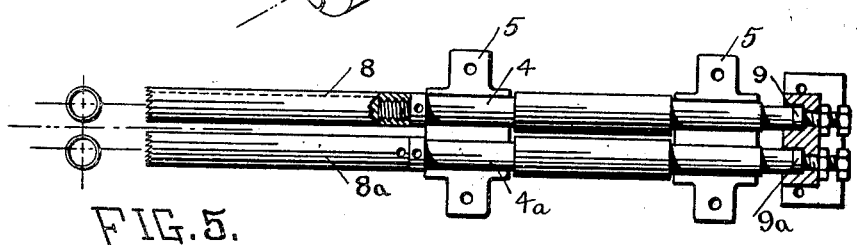
FIG. 5.
FIG. 8.
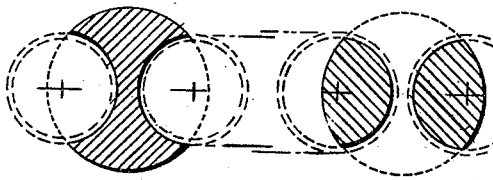
WITNESSES:
H. A. Stephens
I. Gould
INVENTORS
William Sparrow
Nels Peter Nelson
BY
Geo. B. Willcox ATTORNEY.
THE NORRIS PETERS CO., PHOTO-LITHO., WASHINGTON, D. C.

UNITED STATES PATENT OFFICE.

WILLIAM SPARROW AND NELS PETER NELSON, OF BAY CITY, MICHIGAN, ASSIGNORS TO THE MICHIGAN SHADE ROLLER AND BOX COMPANY, OF BAY CITY, MICHIGAN.

MACHINE FOR MAKING EXTENSION-JOINTS FOR ROLLERS.

SPECIFICATION forming part of Letters Patent No. 689,928, dated December 31, 1901.

Application filed February 13, 1901. Serial No. 47,100. (No model.)

*To all whom it may concern:*

Be it known that we, WILLIAM SPARROW and NELS PETER NELSON, citizens of the United States, residing at Bay City, in the county of Bay and State of Michigan, have invented certain new and useful Improvements in Machines for Making Extension-Joints for Rollers; and we do hereby declare the following to be a full, clear, and exact description of the invention, such as will enable others skilled in the art to which it appertains to make and use the same.

This invention is a machine for making extension-joints for curtain-rollers, &c., and is especially adapted for making the class of joints shown in Patent No. 668,063, issued to William Sparrow February 14, 1901.

The improvements consist in certain novel constructions and arrangements of cutting mechanism and means for driving it.

One object of our invention is to produce a machine which shall be compact, simple in construction, and arranged to form cylindrically concaved or convexed tongues on the ends of wooden cylinders or rollers.

A further object is to provide a simple guiding device for centering the roller and means for varying the intensity of pressure on the driving-gear.

The invention is illustrated in the accompanying drawings, throughout the several views of which similar characters of reference designate corresponding parts.

Figure 1 is a top view of the machine. Fig. 2 is a side elevation showing the frame partly in section. Fig. 3 is a perspective detail of the guide for centering the rollers, showing one of the removable bushings by which it is adapted to suit different-sized rollers. Fig. 4 is an end view of the machine. Fig. 5 is a top view of the cylinder-saws and their spindles. Fig. 6 is a perspective view of a sawed roller. Fig. 7 is an end view of the friction driving-gear. Fig. 8 is a diagrammatic view showing the way in which opposite members of a joint are sawed.

As is clearly shown in the drawings, the machine consists in a base 1, carrying a pair of standards 2, between the upper ends of which is journaled a shaft 3, carrying a friction-roller $3^a$. The friction-roller and its shaft can be adjusted vertically to regulate the intensity of driving pressure. Below the friction-roller and parallel with it is placed a pair of horizontal spindles 4 and $4^a$. These spindles are carried by bearings 5, fixed to the base 1. The friction-roller $3^a$ drives the horizontal spindles 4 and $4^a$ and is itself driven by a belt 6, which passes around the main driving-pulley 7.

To the forward end of each of the horizontal spindles is secured a hollow cylinder-saw 8 $8^a$, by which the joint of the roller is shaped. The two saws cut simultaneously as the roller is advanced lengthwise upon them, and the length of cut is regulated by a stop $1^a$, secured to the base 1. The backward thrust of the saws 8 and $8^a$ is taken by washers 9 and $9^a$, which bear against the ends of the spindles 4 and $4^a$ and are adjustably held in place by set-bolts. In front of the cylinder-saws are arranged two guides 10 and 11 for holding the roller in alinement with the saws. These guides consist of brackets fastened to the base 1, having their upper ends bored to receive removable bushings $10^a$ and $11^a$ of various internal diameters to suit rollers of different sizes. The bushing of the back guide $11^a$—the one nearest the saws—is preferably cylindrical; but the bushing of the front guide is semicylindrical, so that the rollers can be easily placed and removed.

The intensity of pressure of the friction-roller $3^a$ upon the horizontal spindles can be varied as desired by turning the set-screws 12, the lower ends of which bear upon the vertically-movable journal-boxes 13, carrying the shaft of the friction-wheel. The belt 6, which is preferably wide, passes through holes in the base 1 on each side of the spindles and serves as a covering to protect their rubbing surfaces. This belt may be tightened and the intensity of pressure of the friction-roller $3^a$ upon the friction-surfaces of the saw-spindles may be increased or decreased by vertically adjusting the shaft of the driving-pulley 7 in the adjustable journal-boxes 14. Thus an additional means for varying the driving pressure of the friction-roller is provided.

The distance between the saws is made to suit the thickness of web desired for the double-concaved tongue of the completed joint.

It is obvious that if the opposite ends of a joint are cut by the same pair of saws they will when put together have a clearance between them equal to the thickness of the saw-kerf. In order to make a tight joint, two pairs of saws are preferably used, the inside kerf diameter of one pair being equal to the outside kerf diameter of the other pair. With this arrangement one member of the extension-joint is cut on one pair of saws and the other member is cut on the second pair. When these two members are put together, they form a perfect-fitting joint.

The middle part of the two-tongued member is severed from the roller by means of chisels that cut from the outer surface of the roller into the center. In like manner the side parts of the single-tongued member are severed by chisels that cut from the outer surface of the roller inwardly to the concaved surfaces of the tongue.

What we claim as our invention, and desire to secure by Letters Patent, is as follows:

1. Means for shaping the faces of a joint for rollers and the like consisting in a pair of cylinder-saws arranged side by side for shaping the cylindrically-concaved faces of the joint; and a second pair of saws arranged side by side for shaping the cylindrically-convexed faces of the joint; the inside kerf diameter of the saws comprising the first pair being equal to the outside kerf diameter of the saws of the other pair.

2. Means for shaping the cylindrically-concaved and cylindrically-convexed faces of a joint for rollers and the like consisting in a pair of parallel cylinder-saws arranged to sever one member of the roller-joint lengthwise with two oppositely-curved arc-shaped saw-cuts, one on each side of the axis of the roller; and a second pair of parallel cylinder-saws for similarly severing the other member of the joint, the inside kerf diameter of one pair of saws being equal to the outside kerf diameter of the other pair of saws, whereby a tight joint is formed when the two members are telescoped.

3. Two parallel cylinder-saws mounted on parallel shafts carrying cylindrical friction-surfaces, together with a single friction-roller engaging each of said shafts to actuate the adjacent edges of the saws simultaneously in opposite directions.

4. Two parallel cylinder-saws mounted on parallel shafts carrying cylindrical friction-surfaces, together with a single friction-roller of larger diameter than said friction-surfaces engaging each of said surfaces; having means for varying its pressure upon said surfaces and arranged to drive the shafts and saws simultaneously, substantially as described.

5. Two parallel cylinder-saws mounted on parallel shafts rotating in fixed bearings and carrying cylindrical friction-surfaces, in combination with a single friction-roller of larger diameter than said friction-surfaces, said roller engaging both of said surfaces and mounted in journal-boxes adjustable by set-screws to vary the pressure of the roller upon said surfaces, together with a belt passing around the friction-roller and outside the friction-surfaces of the shafts.

6. In a machine for shaping the cylindrical faces of an extension-joint for rollers and the like, the combination with a base; of a pair of standards supported by said base and carrying vertically-adjustable journal-boxes having a friction-roller mounted therein; of a pair of parallel horizontal spindles mounted in fixed journal-boxes below the friction-roller and adapted to be driven by contact therewith; of horizontally-adjustable thrust-bearings engaging the rear ends of said spindles; of screw-threads formed on the front ends of said spindles; a pair of hollow cylinder-saws screwed to said threads; a guide-bracket in front of said saws, carrying a removable cylindrical bushing; a second guide-bracket in front of the first bracket, carrying a semicylindrical removable bushing; and means, substantially as described, for driving the friction-roller.

7. In a machine for shaping the cylindrical faces of an extension-joint for rollers and the like, the combination of a frame carrying a driving-pulley; a base mounted on said frame; standards carried by said base; vertically-adjustable journal-boxes secured in said standards and carrying a friction-roller; a belt passing over the friction-roller and driving-pulley; a pair of parallel horizontal spindles below the friction-roller and contacting therewith; parallel cylinder-saws secured to one end of the spindles; thrust-bearings at the other end of the spindles; centering-guides in front of said saws and arranged to guide a roller along the center-line between said saws, substantially as described.

In testimony whereof we affix our signatures in presence of two witnesses.

WILLIAM SPARROW.
NELS PETER NELSON.

Witnesses:
GEO. B. WILLCOX,
WILLIAM STEPHENS.